United States Patent
Matsunaga et al.

(10) Patent No.: US 7,746,817 B2
(45) Date of Patent: Jun. 29, 2010

(54) COMMUNICATION TIMING CONTROL FOR ALLOTTING A TIME SLOT BY A DISTRIBUTED COORDINATION THROUGH INTERACTION WITH NEIGHBORING NODES

(75) Inventors: Toshihiko Matsunaga, Osaka (JP); Masaaki Date, Osaka (JP); Kosuke Sekiyama, Fukui (JP); Yuki Kubo, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 988 days.

(21) Appl. No.: 11/341,510

(22) Filed: Jan. 30, 2006

(65) Prior Publication Data

US 2006/0171421 A1    Aug. 3, 2006

(30) Foreign Application Priority Data

Jan. 31, 2005    (JP) ............................. 2005-023974

(51) Int. Cl.
*H04J 3/10* (2006.01)
*H04J 3/00* (2006.01)
*H04L 7/00* (2006.01)

(52) U.S. Cl. ........................ 370/326; 370/336; 370/498; 375/371

(58) Field of Classification Search ................. 370/498, 370/503–519, 321, 326, 336, 345, 442, 458, 370/468, 915; 375/354, 356, 362–376, 226, 375/269, 273, 279–283, 308, 329–333, 371

See application file for complete search history.

(56) References Cited

U.S. PATENT DOCUMENTS

| 6,370,159 | B1 * | 4/2002 | Eidson ........................ 370/503 |
| 7,072,432 | B2 * | 7/2006 | Belcea ........................ 375/356 |
| 7,466,685 | B2 * | 12/2008 | Date et al. ................... 370/350 |
| 7,609,796 | B2 * | 10/2009 | Date .......................... 375/356 |
| 7,649,871 | B2 * | 1/2010 | Date et al. ................... 370/335 |
| 2002/0186716 | A1 * | 12/2002 | Eidson ........................ 370/503 |
| 2005/0195771 | A1 * | 9/2005 | Matsunaga et al. .......... 370/336 |

FOREIGN PATENT DOCUMENTS

JP    2005-94663 A    4/2005

OTHER PUBLICATIONS

Y. Matsushita et al., "Wireless LAN Architecture," pp. 47, 53-59 and 69, Kyoritsu Shuppan Co., Ltd. Tokyo, Japan, 1996.

* cited by examiner

*Primary Examiner*—Tri H Phan
(74) *Attorney, Agent, or Firm*—Rabin & Berdo, P.C.

(57) ABSTRACT

A transmission timing control apparatus included in a network node constituting a telecommunications system is configured to use the reception timing of a timing signal from another node to determine the transmission timing of a timing signal of the own node and determine a time slot for transmission of a data signal in accordance with the transmission timing and the reception timing of a timing signal from the other node. A response timing signal transmitter transmits a response timing signal when received the timing signal from the other node. A transmission timing control circuit uses the reception timing of the timing signal and that of the response timing signal to determine the timing at which the own node transmits the timing signal.

12 Claims, 7 Drawing Sheets

COMMUNICATION TIMING CONTROL FOR ALLOTTING A TIME SLOT BY A DISTRIBUTED COORDINATION THROUGH INTERACTION WITH NEIGHBORING NODES

BACKGROUND OF THE INVENTION

1. Field of the Invention

The present invention relates to a telecommunications system; and more specifically to a communication timing control apparatus for use in a node included in a telecommunications network for controlling with accuracy a timing at which data are transmitted. The invention also relates to a method of controlling the timing.

2. Description of the Prior Art

As systems for allowing a plurality of spatially distributed nodes to transmit and receive data without any collision, available are the time division multiple access (TDMA) system and the carrier sense multiple access (CSMA) system, such as a CSMA/CA (Carrier Sense Multiple Access with Collision Avoidance) system and a CSMA/CD (Carrier Sense Multiple Access with Collision Detection) system, as taught in Y. Matsushita, et al., "Wireless LAN Architecture", pp. 47, 53-59 and 69, Kyoritsu Shuppan Co., Ltd., Tokyo, Japan, 1996.

In accordance with the CSMA system, a node, intending to transmit data, determines whether or not any other node is in communication by sensing a carrier or frequency, and then transmits the data when having determined that the other nodes are not in communication. However, one of the problems with the CSMA systems is that the number of channels available for communication at the same time is remarkably limited.

The TDMA system allots a particular time slot to each of a plurality of nodes so as to cause each node to transmit data only in the time slot allotted thereto, and allows the number of channels available for communication at the same time to be increased more easily than the CSMA system. When nodes expected to communicate with each other dynamically change, a certain node plays the role of a central or management node for dynamically allotting time slots to the other nodes.

However, the TDMA system has a drawback that, when the central node expected to allot time slots malfunctions, the entire telecommunications system goes down. Further, the TDMA system must dynamically reallot a particular time slot to each node by a sophisticated procedure, and is therefore likely to fail to rapidly adapt to the varying environment. In addition, the TDMA system is unable to vary the width of a time slot itself.

SUMMARY OF THE INVENTION

It is an object of the present invention to provide a telecommunications control apparatus and a method therefor flexible enough to allow each node to determine its own transmission timing in a distributed coordination manner without being controlled by a central node.

A transmission timing control apparatus of the present invention is included in a network node constituting a telecommunications system, and configured to use the reception timing of a timing signal from another node to determine the transmission timing of a timing signal of the network node, and determine a time slot for transmission of a data signal in accordance with the transmission timing and the reception timing of a timing signal from the other node. A response timing signal transmitter transmits a response timing signal when received the timing signal from the other node. A transmission timing control circuit uses the reception timing of the timing signal and the reception timing of the response timing signal to determine a transmission timing at which the network node transmits the timing signal.

A communication timing control method for the above apparatus, a network node including the apparatus and a telecommunications system including a plurality of such nodes are also disclosed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

A preferred embodiment of the communication timing control apparatus for use in network nodes forming a telecommunications system will hereinafter be described in accordance with the present invention. Briefly, the illustrative embodiment allows each node to emit an impulse signal while effectively sensing impulse signals emitted from other, neighboring nodes so as to interact with the neighboring nodes, thereby causing the nodes to allot time slots in a distributed coordination fashion. In addition, the illustrative embodiment successfully improves the accuracy in allotting time slots.

Figure 1:
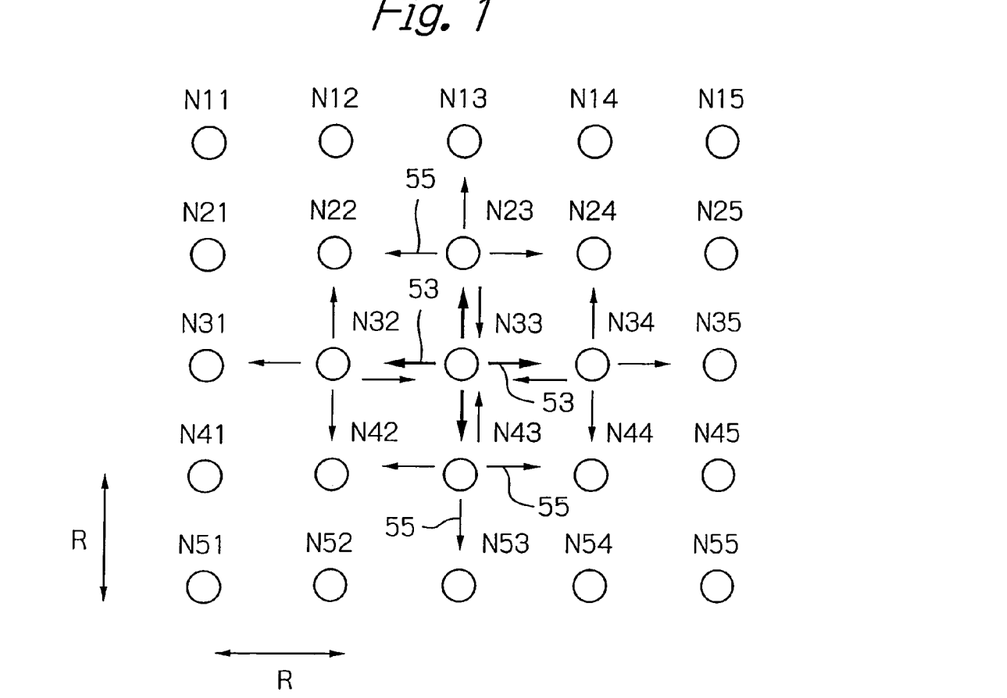
FIG. 1 is a schematic block diagram conceptually showing the general configuration of a telecommunications network system embodying the present invention.

FIG. 1 shows the general configuration of a telecommunications network system embodying the present invention. As shown, a plurality of node N11 through N55 for data communication are distributed or disposed in a planer lattice or matrix pattern by way of example. Each of the nodes N11 through N55 is capable of transmitting and receiving data signals to and from the other nodes lying in the range or distance R serviced thereby. For example, one of the nodes, N33, is adapted for transmitting and receiving data signals to and from the neighboring nodes N23, N32, N34 and N43. On the other hand, the node N33 is also adapted to transmit impulse signals, i.e. a reference impulse signal or a response impulse signal to be described specifically later over a distance the same as or longer than the distance R for the data signal. Any one of the nodes may additionally play the role of a beacon node. The nodes N11 through N55 may be of fixed or mobile stations or terminals. The following description will, however, proceed in an application where they are fixed terminals.

Figure 2:
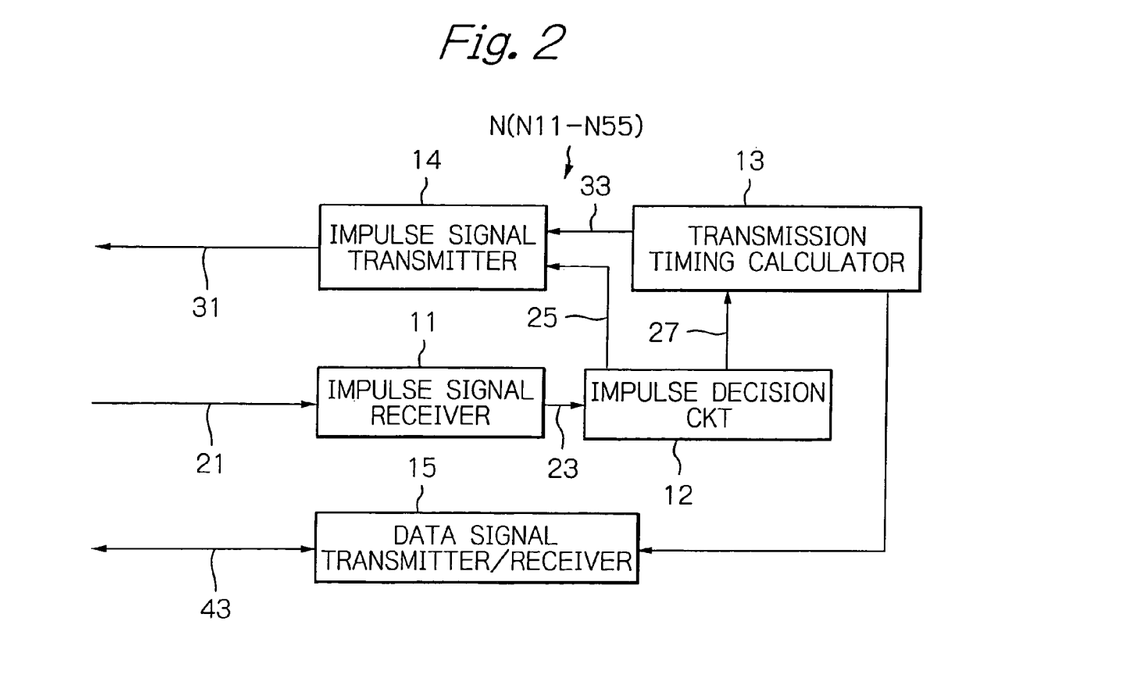
FIG. 2 is a schematic block diagram showing a node constituting the telecommunications network system of the embodiment shown in FIG. 1.

FIG. 2 is a schematic, block diagram showing the configuration of one of the nodes N11 through N55, which are of the same structure as each other. As shown, the node, labeled N, includes an impulse signal receiver 11, an impulse decision circuit 12, a transmission timing calculator 13, an impulse signal transmitter 14 and a data signal transmitter/receiver 15, which are interconnected as illustrated.

The impulse signal receiver 11 is adapted to receive on its input port 21 an impulse signal transmitted from a neighboring node and not conveying destination information. In the following, signals are designated with reference numerals designating connections on which they appear. The words "neighboring node" may refer to a node other than the node N of interest and existing in a range over which the electromagnetic wave emitted from the node N can propagate. It is to be noted that an impulse signal refers to a signal transmitted and received as a communication timing signal and has its impulse waveform of a Gaussian or similar distribution. The impulse signal receiver 11 is adapted to provide the impulse decision circuit 12 with an impulse signal 23, which may be the received impulse signal itself, an impulse signal resultant from shaping the waveform of the received impulse signal or an impulse signal regenerated from the received impulse signal.

The impulse decision circuit 12 is adapted to determine the kind of the impulse signal 23 input from the impulse signal receiver 11. In the illustrative embodiment, the impulse signal 23 is either one of a reference impulse signal and a response impulse signal. The reference impulse signal is of reporting a timing representative of the start of transmission of a data signal from a node N while the response impulse signal is an impulse signal received and then transferred. In order to distinguish the reference and response impulse signals from each other, the impulse signal is provided with a transfer identifier, TTL (Time to Live) field or waveform. To the TTL field of the reference and response impulse signals, a (logical) ONE and a (logical) ZERO are respectively assigned. For example, a particular waveform is assigned to each of the TTL fields defining ONE and ZERO.

The impulse decision circuit 12 is adapted for referencing the TTL field of the received impulse signal 23 to determine whether the received impulse signal 23 is a reference impulse signal that should be transferred or a response impulse signal that should not be transferred. If the received impulse signal 23 is a reference impulse signal, the impulse decision circuit 12 then delivers the impulse signal 25 to the impulse signal transmitter 14. The impulse decision circuit 12 also has the function of arbitrating the conflict between a plurality of response impulse signals caused by a single reference impulse signal. Further, the impulse decision circuit 12 reports on its output port 27 the receipt of an impulse signal to the transmission timing calculator 13 without regard to the kind of the received impulse signal 23.

The TTL field, used to distinguish the reference and response impulse signals from each other is not essential to the illustrative embodiment. Alternatively, an arrangement may be made such that, when the node N, having received an impulse signal 21 from the network, cannot identify a TTL field, it determines that the impulse signal 21 is a response impulse signal.

The impulse signal transmitter 14 is adapted to transmit an impulse signal 31 to the network. Specifically, the transmitter 14 transmits a reference impulse signal when a transmission request is fed on its input port 33 from the transmission timing calculator 13, or transmits a response impulse signal when it is fed on its input port 25 from the impulse decision circuit 12.

The transmission timing calculator 13 is adapted to generate a phase signal, which determines or defines the transmission timing of a node of interest, in response to the received impulse signal 27 coming from the impulse signal receiver 11. Assuming that the phase signal of a node of interest i has a value of $\theta_i(t)$ at a time t, then the transmission timing calculator 13 varies the phase signal $\theta_i(t)$ by each variation represented by an expression (1):

$$d\theta_i(t)/dt = \omega + \sum_{k=1}^{N} P_k(t) \cdot R(\theta_i(t), \sigma(t)), \quad (1)$$

where $\theta_i(t)$ denotes the phase signal of the node i, $\omega$ denotes a specific angular frequency parameter, $P_k(t)$ denotes a received impulse signal received from a neighboring node, and $R(\theta_i(t), \sigma(t))$ denotes a phase response function.

The expression (1) is representative of a rule for varying the nonlinear oscillation rhythm of the phase signal $\theta_i(t)$ of the own node i in response to a signal provided from the impulse decision circuit 12. In the expression (1), the first term $\omega$ of the right side, denoting a specific angular frequency parameter, is representative of a basic variation rhythm assigned to all nodes constituting the network and corresponding to the basic rate of transition of the own operation state. The second term of the right side is representative of a nonlinear variation. In the illustrative embodiment, the specific oscillation frequency parameter $\omega$ is the same throughout the system. The function $P_k(t)$ is representative of a signal output from the impulse decision circuit 12 in response to an impulse signal received from a neighboring node k, which is a natural number of 1 to N. The function $R(\theta_i(t), \sigma(t))$ is a phase response function expressing a response characteristic that causes the basic rhythm of the node i to vary in response to an impulse signal received from another node; this function accords to, e.g. the following expression (2):

$$R(\theta_i(t), \sigma(t)) = \sin(\theta_i(t) + \sigma(t)), \sigma(t) = \pi + \phi(t), \quad (2)$$

where $\phi(t)$ denotes a random noise function.

The expression (2) indicates that the phase response function is determined or defined by the sinusoidal wave of a phase value produced by superposing random noise on the phase opposite to the phase signal $\theta_i(t)$ at the time t. With this configuration, the illustrative embodiment realizes a nonlinear characteristic that causes nearby nodes N to tend to become opposite in phase (inversion of an oscillation phase) to each other, and uses such a characteristic to avoid collisions. More specifically, in order to prevent the transmission timings of impulse signals sent out from neighboring nodes from colliding with each other, the illustrative embodiment establishes a suitable time relation or lag into a timing at which the phase signals of those nodes take the same value.

In the expression (2), a constant term $\pi[\text{rad}]$, forming part of the function $\sigma(t)$, implements the nonlinear characteristic that causes nearby nodes to tend to become opposite in phase. The random noise function $\sigma(t)$, which accords to, e.g. a Gaussian distribution with a mean value of zero, provides the nonlinear characteristic with random variability. The random variability copes with an occurrence that the system would otherwise fail to reach the target stable state or optimum solution and fall in a different stable state or local solution.

Although the expression (2) uses a sinusoidal function as the simplest model of the phase response function $R(\theta_i(t), \sigma(t))$, use may be made of any other suitable function as a phase response function. If desired, the constant term n of the function a(t) may be replaced with any other suitable constant $\lambda(0<\lambda<2\pi)$, in which case nearby nodes tend to become different in phase from each other instead of becoming opposite in phase to each other.

The functional principle of the transmission timing calculator 13 will be described more specifically with reference to FIGS. 3A through 3C and 4A through 4C. It is to be noted that the function of the impulse signal transmitter 13 also relates to state transitions shown in FIGS. 3A through 4C. Paying attention to a given node N, FIGS. 3A through 4C demonstrate a relation between the given node or node of interest i and another node or neighboring node j, i.e. how a phase relation-between the nonlinear oscillation rhythms of the nodes i and j varies with the elapse of time.

Figure 3A:
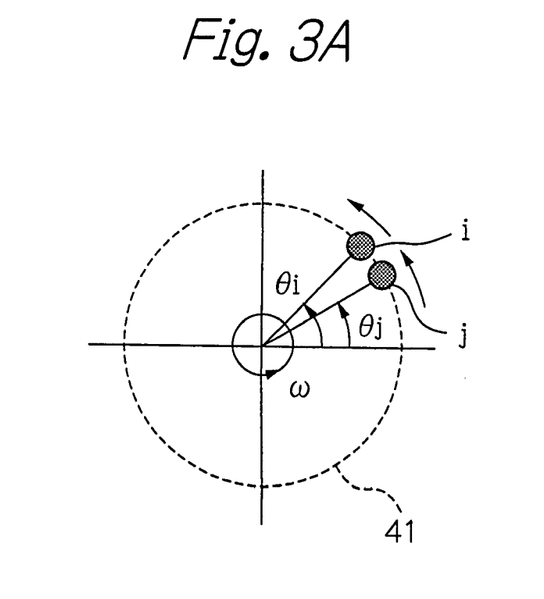
FIGS. 3A, 3B and 3C demonstrate consecutive conditions in which two of the nodes are tuned to each other in the illustrative embodiment.
Figure 3B:
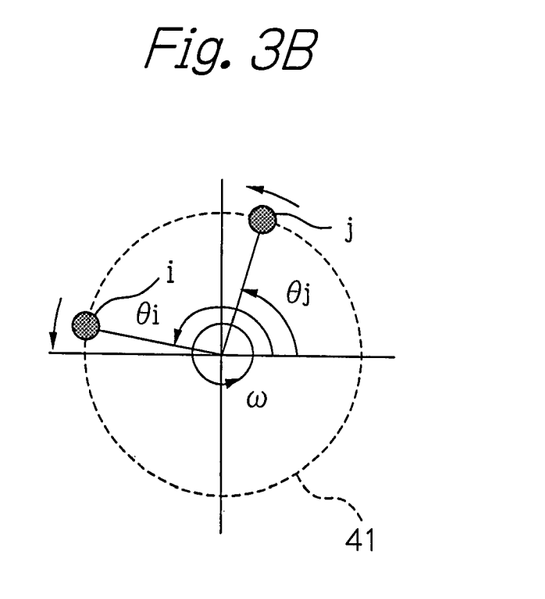
Figure 3C:
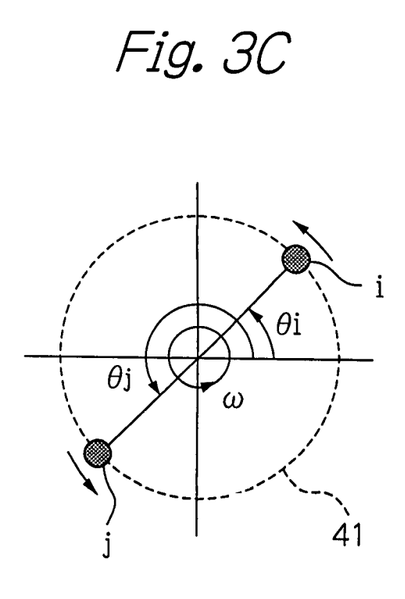

FIGS. 3A, 3B and 3C show a specific case wherein a node of interest or own node i and a single node j adjoining it exist together. In FIGS. 3A, 3B and 3C, two material points i and j, rotating on a circle 41, are respectively representative of the nonlinear oscillation rhythm of the node of interest i and that of the neighboring node j. The angles $\theta_i$ and $\theta_j$ of the material points i and j, respectively, on the circle 41 are representative of the instantaneous values of phase signals. The circular movements of the material points i and j are projected onto the ordinate or the abscissa to represent the respective nonlinear oscillation rhythms. The two material points i and j tend to become opposite in phase to each other in accordance with the operation represented by the expressions (1) and (2). As a result, even when the phases of the two material points i and j are close to each other, as shown in FIG. 3A, the state varies as the time elapses via a transitional state shown in FIG. 3B to a stable state shown in FIG. 3C in which the phase difference between the two points i and j is substantially equal to pi, $\pi$.

The two material points i and j rotate at the primary angular velocity equal to the respective specific angular oscillation frequency parameter $\omega$. When the two nodes N become interactive in response to impulse signals transmitted therebetween, the two points i and j vary the angular velocity thereof ahead or behind so as to ultimately establish the stable state at which the appropriate relation is maintained. This operation may be considered to indicate that the two points i and j repel each other while rotating to establish the stable phase relation. In the stable state, FIG. 3C, if each of the two nodes is adapted to transmit the output impulse signal when it is in a predetermined phase, e.g. zero, then both nodes are brought into the transmission timing to establish the appropriate timing relation with each other.

Figure 4A:
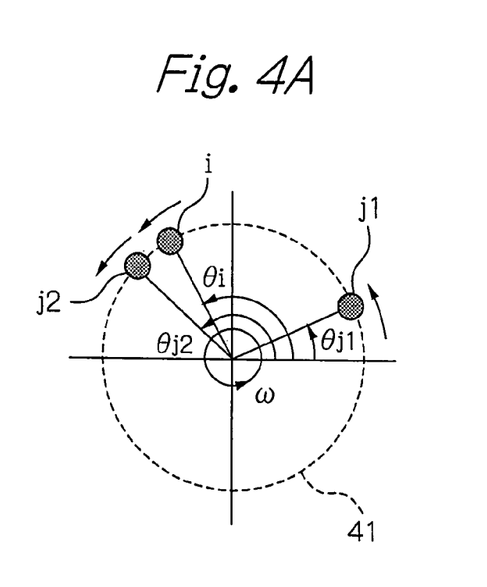
FIGS. 4A, 4B and 4C demonstrate consecutive conditions in which three of the nodes are tuned to each other in the embodiment.
Figure 4B:
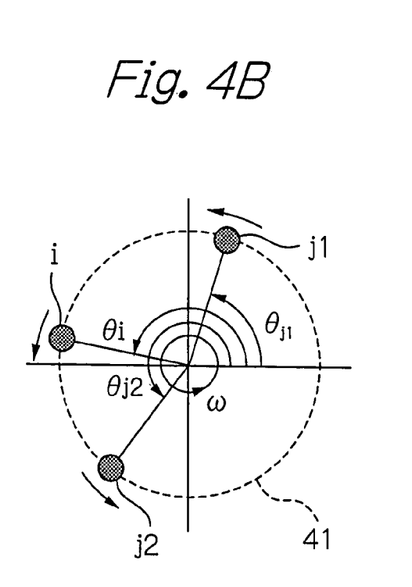
Figure 4C:
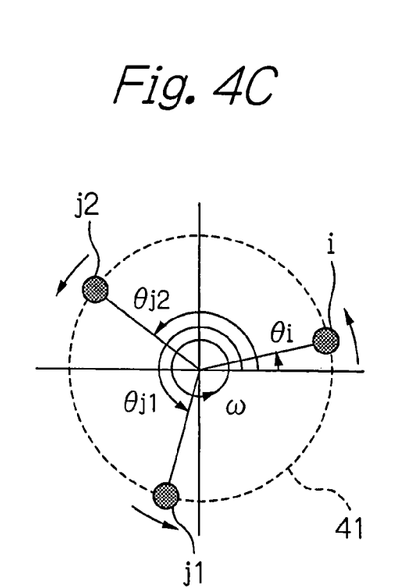

FIGS. 4A, 4B and 4C show another specific case wherein the own node i and two neighboring nodes j1 and j2 exist together. In this case, too, the material points i, j1 and j2 repel each other while in rotation, establishing the stable phase relation with respect to time. This is also true when three or more nodes neighbor the node of interest i.

The stable phase relation or stable state thus established is, in nature, remarkably adaptive to a change in the number of neighboring nodes, i.e. remarkably flexible. For example, assume that, when a single node j1 neighbors the node of interest i in a stable phase relation or stable state, another neighboring node j2 is added. Then, although the stable state is once disturbed, a new stable state is again established with the node of interest i and two neighboring nodes j1 and j2 via a transitional or transient state. This is also true when either one of the neighboring nodes j1 and j2 disappears or fails due to an error or similar cause occurring therein.

Referring again to FIG. 1, the transmission timing calculator 13 is adapted to determine or establish the transmission timing of a reference impulse signal in response to the phase signal $\theta_i(t)$ and then command the impulse signal transmitter 14 the transmission timing thus determined, as symbolically depicted with the connection 33. More specifically, when the phase signal $\theta_i(t)$ reaches a predetermined phase $\alpha(0 \leq \alpha < 2\pi)$, the transmission calculator 13 commands the impulse signal transmitter 14 to transmit a reference impulse signal. The predetermined phase $\alpha$ should preferably be uniform in the entire telecommunications system and will be assumed to be zero hereinafter. In the state shown in FIG. 3C, because the phase signals of the nodes i and j locally differ in phase from each other by n in the stable state, the transmission timings of output impulse signals 31 from the node i and j are shifted from each other by n despite that $\alpha$ is uniform in the entire system.

Further, the transmission timing calculator 13 is adapted to determine whether mutual adjustment or tuning executed between the own node and one or more neighboring nodes as to the transmission timing of a reference impulse signal is in the transitional state shown in FIG. 3B or 4B or in the stable state shown in FIG. 3C or 4C. More specifically, monitoring the reception timing of an impulse signal 21, i.e. a reference or response impulse signal, and the transmission timing of a reference impulse signal from the own node, the transmission timing calculator 13 determines that the mutual adjustment mentioned above is in the stable state when the time lag between the transmission timings of the nodes, which transmit and receive impulse signals with each other, is stable with respect to time. The transmission timing calculator 13 uses the phase signal $\theta_i(t)$ as a signal for grasping the transmission timing of an impulse signal from the own node.

To make the above decision on tuning, the transmission timing calculator 13 may execute the following specific sequence of steps. The transmission timing calculator 13 monitors, over a single period of the phase signal $\theta_i(t)$, the value $\beta$ of the phase signal $\theta_i(t)$ occurring at the output timing of a signal 27 from the impulse decision circuit 12. Assume that the values $\beta$ of the phase signal $\theta_i(t)$ thus monitored are $\beta1, \beta2, \ldots, \beta N$ $(0<\beta1<\beta2<\ldots \beta N<2\pi)$. The transmission timing calculator 13 then calculates, based on the monitored values $\beta$, differences between nearby values, i.e. phase differences $\Delta1=\beta1, \Delta2=\beta2-\beta1, \ldots, \Delta N=\beta N-\beta(N-1)$.

The transmission timing calculator 13 executes the steps stated above every period of the phase signal $\theta_i(t)$ to thereby produce variations or differences, $\gamma1=\Delta1(\tau+1)-\Delta1(\tau), \gamma2=\Delta2(\tau+1)-\Delta2(\tau), \ldots, \gamma N=\Delta N(\tau+1)-\Delta N(\tau)$ between the phases in the consecutive periods where $\tau$ denotes a given phase of the phase signal $\theta_i(t)$ while $\tau+1$ denotes a period immediately following the phase signal $\theta_i(t)$. Thereafter, the transmission timing calculator 13 determines that the tuning is in the stable state when the variations $\gamma$ all are smaller than a small parameter or threshold value e, i. e. when there hold relations of $\gamma1<\epsilon, \epsilon2<\epsilon, \ldots, \gamma N<\epsilon$. Alternatively, the transmission timing calculator 13 may be adapted for determining that the tuning is in the stable state when the relations $\gamma1<\epsilon, y2<\epsilon, \ldots, \gamma N<\epsilon$ are continuously satisfied over a consecutive plurality (M) of periods, in which case the degree of the stable state increases with an increase in the number M of the consecutive periods. Further, the transmission timing calculator 13 may be adapted to make a decision on the stable state in response to part of or some kind of received impulse signals 21.

When the result of the decision on tuning shows the stable state, the communication timing calculator 13 determines or establishes a transmission time from the node N, or time slot, on the basis of the minimum value $\beta1$ of the phase signal $\theta_i(t)$ at the reception timing of an impulse signal 21 every period of the phase signal θ$_i$(t) and commands the data signal transmitter/receiver 15 the transmission time or time slot thus determined.

The time slot mentioned above is a period of time over which the phase signal θ$_i$(t) remains in the range of, e.g. δ1<θ$_i$(t)≦β1−δ2. The start point of the time slot at which the phase signal is assumed to have the above value δ1 coincides with the time when the transmission of a reference impulse signal ends. On the other hand, the end point of the time slot at which the phase signal is assumed to have the value β1-δ2 is set to the time preceding the timing of the first impulse signal in every period of the phase signal by some amount of offset δ2. The values δ1 and δ2 are defined as a phase width corresponding to a minute or short period of time for ensuring that impulse and data signals do not exit at the same time regardless of the signals having been sent out from the own node or other nodes.

The data signal transmitter/receiver 15 functions as transmitting a data signal 43 to the network or receiving a data signal 43 from the network within the period of time indicated by the transmission timing calculator 13. FIG. 2 does not specifically show circuitry for data processing, which may produce and receive data.

Now, even when the system is adapted to transmit and receive only a reference pulse signal and not a response signal to and from nodes, each node is able to autonomously determine or establish a time slot that defines the respective transmission timing if the expression (1) is used. However, in the illustrative embodiment, each node is configured, for the following reasons, to transmit and receive not only a reference impulse signal but also a response impulse signal to and from other nodes to autonomously establish a time slot that defines the transmission timing of the node.

Figure 5:
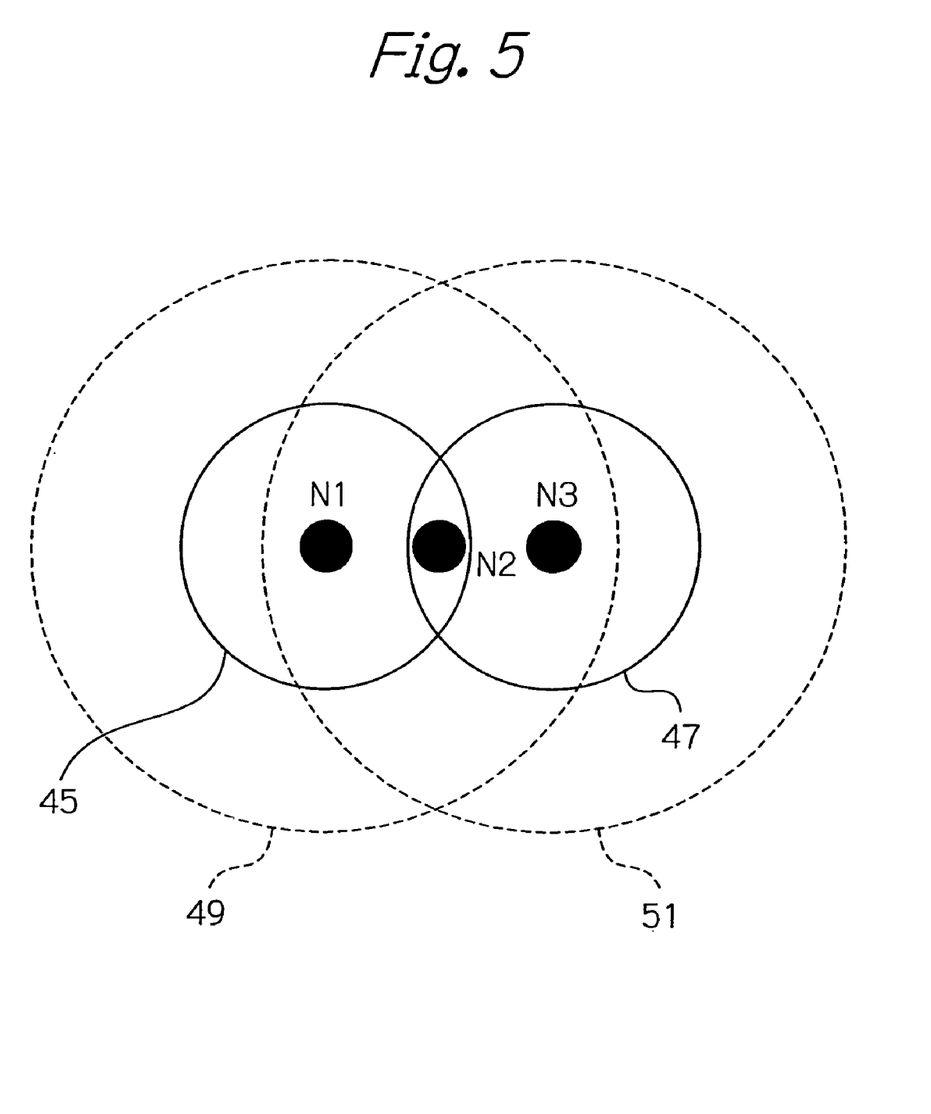
FIG. 5 is a view useful for understanding why a response impulse signal is introduced in the illustrative embodiment.

A problem occurs when the propagation distance of a data signal and that of an impulse signal are equal to each other, e.g. when nodes are located at positions exemplified in FIG. 5. Specifically in FIG. 5, a node N2 exists within the data signal propagation ranges of both of nodes N1 and N3 indicated by solid circles 45 and 47, respectively. In this condition, assume that the nodes N1 and N3 are apart from each other by a distance equal to or longer than the data signal propagation ranges 45 and 47, respectively, giving rise to a hidden node problem. Then, the nodes N1 and N3 each try interaction between two nodes, whereas the node N2 tries to execute interaction between three nodes, making it difficult for the phase signal to become stable.

To solve the above problem, the impulse signal propagation ranges each could be made two times as long as the data signal propagation ranges 45 and 47, as indicated by dotted circles 49 and 51, respectively, in FIG. 5, so that interaction can be executed between the nodes lying in a range 49 or 51 two times as long as the data signal propagation range 45 or 47, respectively. Because it is difficult to precisely set the propagation range of an electromagnetic wave, the propagation ranges 49 and 51 of an impulse signal would be selected to be two times or more as long as the propagation ranges 45 and 47 of a data signal, respectively. This would bring about a problem that each node should be configured to highly accurately adjust the propagation range or transmission power of a data signal and that of an impulse signal.

In order to solve the hidden node problem without resorting to the accurate adjustment of the propagation range or transmission power of a data or impulse signal, however, the illustrative embodiment introduces the concept of a response impulse signal.

A specific operation of the nodes of the illustrative embodiment will be described hereinafter, taking the node N33 shown in FIG. 1 as an example. In the illustrative embodiment, the data and impulse signal propagation ranges are selected to be substantially equal to each other.

The node N33 is capable of directly transmitting and receiving impulse and data signals from nodes N23, N32, N34 and N43 lying in its propagation range having the radius R. In FIG. 1, thick arrows 53 between the nodes are representative of reference pulse signals emitted from the node N33 while thin arrows 55 are representative of response impulse signals resultant from transferred reference pulse signals.

When the node N33 reaches a timing for transmitting its own timing signal, e.g. a position where the phase is zero, the impulse signal transmitter 14 of the node N33 emits a reference impulse signal from its output port 31 to the network. This reference impulse signal is received by the nodes N23, N32, N34 and N43 neighboring the node N33.

In each of the nodes N23, N32, N34 and N43, when received the reference impulse signal from the node N33 on the input port 21, the impulse decision circuit 12 determines whether the received impulse signal 23 is a reference or response impulse signal. In this case, because a ONE is stored in the TTL field of the received impulse signal 23, the impulse decision circuit 12 causes the impulse signal transmitter 14 to transmit a response impulse signal from its output port 31. Without regard to the result of the above decision, the nodes interact with each other by using the reception timing of the received impulse signal 21. For example, a response impulse signal which the node N23 transmits in response to the reference impulse signal received from the node N33 is received by the nodes N13, N22, N24 and N33.

Each of the nodes transfers the response impulse signal at a particular response impulse signal transfer timing shifted differently from node to node within a preselected masking period of time. It is thereby possible to avoid a collision between response impulse signals to be destined to other nodes.

In each of the nodes N13, N22, N24 and N33, when received the response impulse signal from the node N23, the impulse decision circuit 12 determines that the received impulse signal 21 is a response impulse signal because a ZERO is stored in the TTL field. In this case, the impulse decision circuit 12 simply feeds the result of the decision to the communication timing calculator 13 without causing the response impulse signal to be further transferred.

All nodes execute interaction processing without distinguishing a reference impulse signal from a response impulse signal.

The node N13 indirectly receives the impulse signal sent out from the node N33, as stated above, but does not receive a data signal sent out from the node N33. On the other hand, the node N23 can receive data signals sent out from both of the nodes N13 and N33. Thus, the provision of a response impulse signal, causing a reference impulse signal to be transferred, causes the situation where the impulse signal propagation ranges 49 and 51 as shown in FIG. 5 would appear expanded twice as great as the data signal propagation ranges 45 and 47 to allow the nodes lying in the expanded ranges to interact with each other.

In the illustrative embodiment, each node is capable of adjusting the simultaneous arrival of response impulse signals derived from a single reference impulse signal. More specifically, a first preselected masking period of time is assigned to the impulse decision circuit 12 or the impulse signal receiver 11. When the impulse decision circuit 12, for example, receives a second response impulse signal after the receipt of a first response impulse signal but before the elapse of the first masking period of time, the decision circuit 12 determines that the second response impulse signal is derived from the same reference impulse signal as the first response impulse signal, thus not making a decision on transfer nor execute interaction.

For example, paying attention to the node N22 that receives response impulse signals sent out from two nodes N32 and N34, the impulse decision circuit 12 makes a decision on transfer and executes interaction with the response impulse signal received first, but does not do so with the other response impulse signal received later within the first masking period of time. The first masking period of time is so selected as to adequately implement such adjustment.

Further, the nodes are configured to neglect, when having transmitted a reference impulse signal, a response impulse signal relating to that reference impulse signal transmitted. More specifically, a preselected second masking period of time is assigned to the impulse decision circuit 12 or the impulse signal receiver 11. When the impulse decision circuit 12, for example, receives a response impulse signal after the transmission of its own reference impulse signal but before the elapse of the second masking period of time, the decision circuit 12 determines that the above response impulse signal is derived from a reference signal which the own node transmitted, thus not making a decision on transfer nor execute interaction.

For example, although the node N33 receives response impulse signals from the neighboring nodes N23, N32, N34 and N43 after the transmission of a reference impulse signal, the node N33 discards the response impulse signals because they arrive before the second masking period of time elapses after the transmission of the reference impulse signal. Thus, the second masking period of time is so selected as to adequately discard response impulse signals fed back to the own node.

As stated above, an impulse signal or reference impulse signal sent out from a certain node is received by four nodes at which the reference impulse signal arrives and eight nodes at which response impulse signals arrive, i.e. twelve nodes in total, with the exemplified situation. For example, when an impulse signal is transmitted from the node N33, a reference impulse arrives at the nodes N23, N32, N34 and N43 while response impulse signals arrive at the nodes N13, N22, N24, N31, N35, N42, N44 and N53. Conversely, when impulse signals are transmitted from the twelve nodes N23, N32, N34 and N43 and N13, N22, N24, N31, N35, N42, N44 and N53, the node N33 receives the impulse signals either directly or indirectly and therefore performs interaction divided into up to thirteen inclusive of the own node in a single period.

Among the nodes N23, N32, N34 and N43 lying in the range over which a data signal transmitted from the node N33 can propagate, the nodes capable of receiving the data signal and the node N33 interact with each other, and are therefore free from a collision between data signals.

Figure 6:
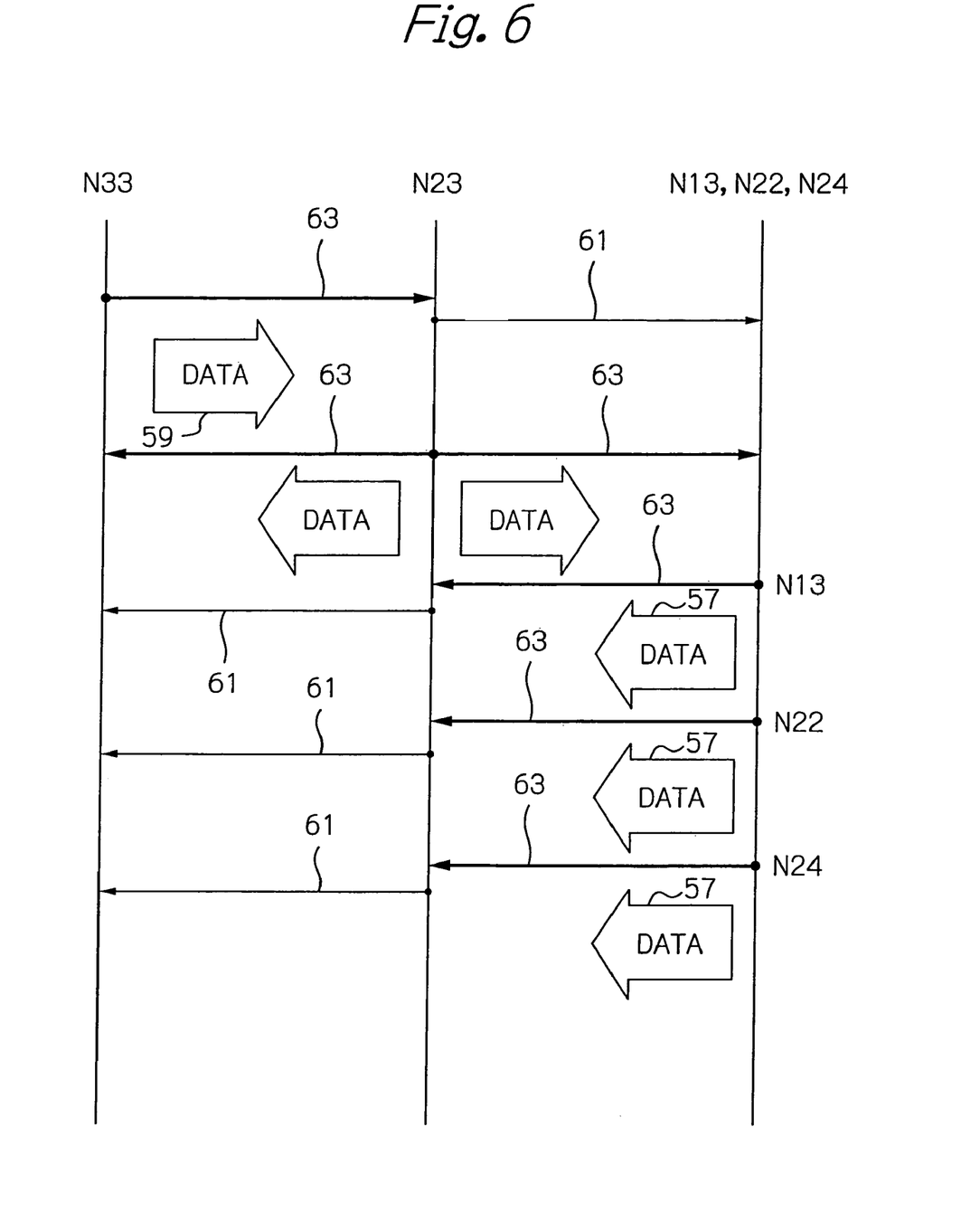
FIG. 6 is a sequence chart useful for understanding why time slots allotted in the illustrative embodiment do not collide with each other.

For example, as shown in FIG. 6, the node N23 receives data signals 57 from the nodes N13, N22 and N24 in addition to a data signal 59 from the node N33. However, a collision between the data signals 57 and 59 does not occur at the node N23 because the nodes N13, N22 and 24 interact with the node N33 and are therefore shifted in the transmission timing of a data signal from the node N33 although unable to receive the data signal 59 sent out from the node N33. In the figure, thin arrows 61 indicate impulse signals, and thick arrows 63 indicate reference impulse signals.

As stated above, the illustrative embodiment achieves various unprecedented advantages, as will be described hereinafter. Whereas the conventional TDMA system causes a single central node to allot time slots to the remaining nodes, the illustrative embodiment allows each node to interact with neighboring nodes and therefore allows time slots to be allotted to the nodes in a distributed coordination fashion without resorting to a central node. This obviates an occurrence that an error occurring in the central node causes all nodes under the control of a central node to fail.

Even when a node is added to or removed from the system or when an error, movement or similar event occurs in part of the system, a group of nodes relating to the event are capable of adaptively reallotting time slots in a distributed coordination fashion while the remaining nodes are capable of continuously executing data communication in their original time slots.

The autonomous adjustment of time slots mentioned above is executed between nearby nodes, so that nodes located at positions where they do not effect each other are capable of transmitting data signals at the same time. More specifically, although data are transmitted at various locations in the system while overlapping each other with respect to time, the illustrative embodiment causes any nearby nodes where electromagnetic waves are liable to interfere with each other to mutually, autonomously adjust the allotment of time slots, thereby avoiding data collisions.

In the illustrative embodiment, an arrangement may be made such that only a node that generates traffic sends out an impulse signal. In such a case, every time the node, generating traffic, changes with the elapse of time, time slots can be effectively reallotted so as to realize effective data communication with nodes generating the traffic.

An impulse signal is propagated over substantially the same distance as a data signal and further transferred by a node having received it. This promotes easy setting of distances, compared to the case wherein the propagation distance of an impulse signal must be two times or more as great as that of a data signal.

In the illustrative embodiment, interaction is executed only in a range including impulse signal transfer nodes and a node capable of transmitting a data signal thereto. This reduces the number of interactive nodes for thereby increasing the time slot allotment width accordingly, compared to the case wherein the propagation distance of an impulse signal must be two times or more as grate as that of a data signal. For example, if the node N23 is absent, then the nodes N33 and N13 do not have to interact with each other because data signals, which may be sent out from the two nodes at the same time, do not collide with each other; the nodes N33 and N13 would interact with each other even in such a condition if the propagation distance of an impulse signal were two times or more as great as that of a data signal.

Figure 7:
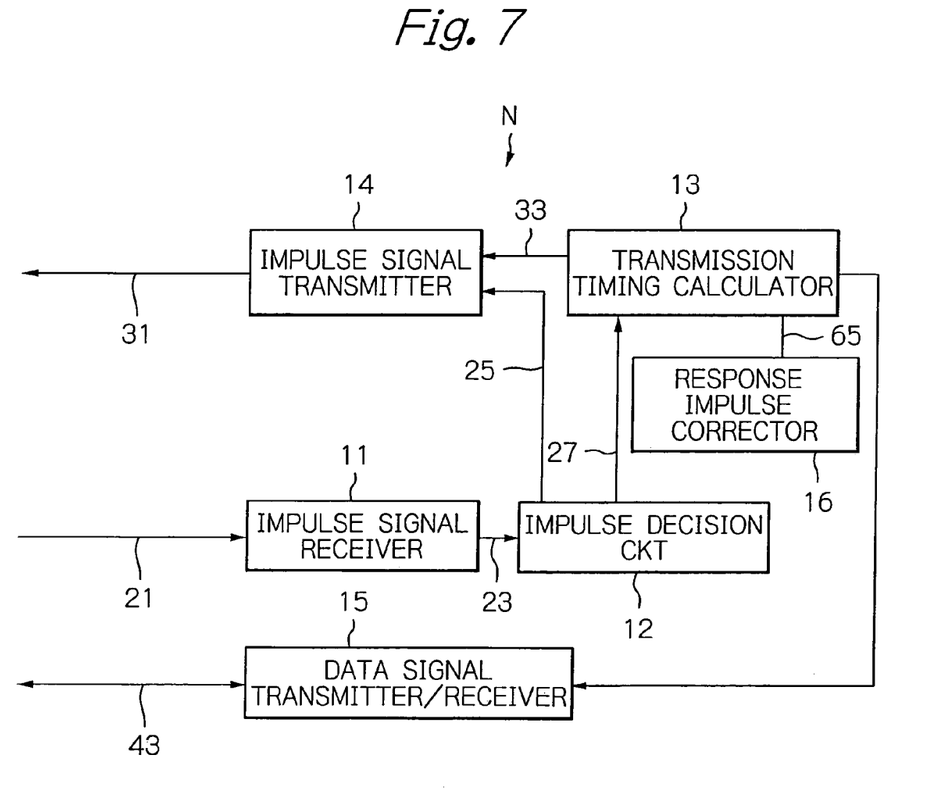
FIG. 7 is a schematic block diagram, like FIG. 2, showing an alternative embodiment of the present invention.

An alternative embodiment of the present invention will be described hereinafter. FIG. 7 is a schematic block diagram showing the configuration of the node N, which may be any one of the nodes N11 through N 55 of FIG. 1, included in the illustrative embodiment. In FIG. 7, structural elements like those shown in FIG. 2 are designated by identical reference numerals, and detailed description thereof will not be made in order to avoid redundancy.

As shown in FIG. 7, the node N includes a response impulse corrector 16 in addition to the circuits of the previous embodiment. In order for a response signal not to collide with a reference impulse signal, it is required that a response impulse signal be transmitted on the elapse of a predetermined period of time after the receipt of the reference impulse signal. That requirement may cause an error in the interaction of a node having received a response impulse signal. For that aim, in the alternative embodiment, the response impulse corrector 16 is provided to obviate the above error in cooperation with the communication timing calculator 13.

Figure 8:
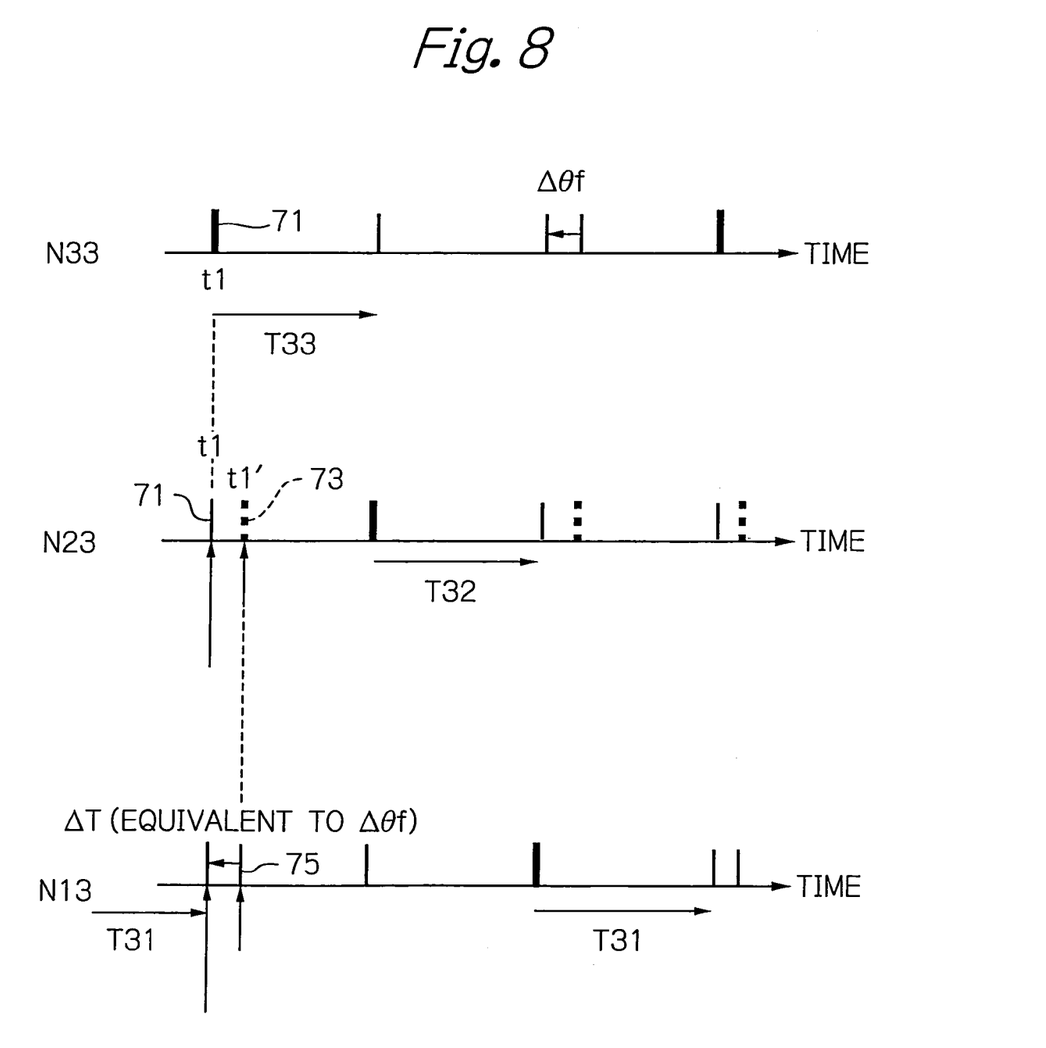
FIG. 8 is a timing chart useful for understanding the significance of a response impulse signal corrector included in the alternative embodiment.

More specifically, when the impulse decision circuit 12 determines that a received impulse signal is a response impulse signal, the response impulse corrector 16 corrects the value of the phase signal at the time of the receipt with a preselected correction value $\Delta\theta f$, see FIG. 8, so that the transmission timing calculator 13 can use the resulting value 65 for the calculation of interaction. The correction value $\Delta\theta f$ is determined or selected by, e.g. experiments beforehand. If desired, the phase correction value $\Delta\theta f$ may be replaced with a correction period of time $\Delta T$ although the period of time $\Delta T$ has to be converted to a phase based on angular velocity $\omega$ by an additional step.

The operation of the node N unique to the alternative embodiment will be described hereinafter. The impulse decision circuit 12 determines the kind of a received impulse signal 21 and feeds, upon determining that an impulse signal is received, the impulse signal 37 to the transmission timing calculator 13 without regard to the kind of the impulse signal, as with the previous embodiment. At this instant, in the alternative embodiment, however, the impulse decision circuit 12 also provides the transmission timing calculator 13 with information 65 on the kind of the impulse signal 21, i.e. which of a reference and a response impulse signal the impulse signal 21 is.

When a response impulse signal 27 is input to the transmission timing calculator 13 from the impulse decision circuit 12, the calculator 13 obtains a value $\theta$-$\Delta\theta f$ produced by retarding the value of the phase signal, which is identical with the phase signal $\theta_i$ of the expression (1), by the correction value $\Delta\theta f$ stored in the response impulse corrector 16. The transmission timing calculator 13 then uses the above value $\theta$-$\Delta\theta f$ as the receipt phase of the response impulse signal to solve the interaction expression (1).

As stated above, the transmission timing calculator 13 uses the reception timing of an impulse signal from another node or the transmission timing of an impulse signal from the own node to execute interaction so as to determine or fix the transmission timing of an impulse signal from the own node in accordance with the expression (1). However, because the calculator 13 executes correction when a response impulse signal 21 is input or received, the transmission timing of an impulse signal or reference impulse signal from the own node is advanced, compared to the transmission timing of the previous embodiment.

Assuming that, among the nodes N11 through N55 shown in FIG. 1, only three nodes N13, N23 and N33 are interactive with each other, FIG. 8 demonstrates specific transmission and reception timings of impulse signals occurring in a stable state.

A reference impulse signal 71 is transmitted from the node N33 at a time t1, and arrives at the node N23 at a time substantially coincident with the time t1. However, in order to prevent a response impulse signal sent out by the own node N23 from colliding at another node with a reference impulse signal sent out from the node N13, the node N23 transmits the response impulse signal 73 at a time t1', which is later than the receipt time t1 of the reference impulse signal 71, which is substantially coincident with t1, by the predetermined period of time $\Delta T$. Consequently, the node N13 indirectly receives the impulse signal 75 from the node N33 at the time t1'. By turning back the receipt time t1' by the predetermined period of time $\Delta T$, it is possible to restore the time t1 at which the node N33 transmitted the reference impulse signal 71. From the viewpoint of phase, the correction by the predetermined period of time $\Delta T$ is equivalent to the correction of the phase by the correction value $\Delta\theta f$. In this manner, a value is used which is close to the phase at the time t1 at which the node N33 sent out the reference impulse signal 71, interaction thus being calculated.

The node N13, more specifically the transmission timing calculator 13 thereof, regards its own time slot as the period of time up to the corrected reception timing, T31 in FIG. 8, while regarding the interval between the times t1 and t1' as the time slot, T33 in FIG. 8, for the node N33.

With the construction described above, the alternative embodiment achieves the same advantages as the illustrative embodiment shown in and described with reference to FIG. 2. Further, in the alternative embodiment, the response impulse corrector 16 corrects the reception phase of a response impulse signal with a value corresponding to a time lag between the transmission of a reference impulse signal and the transmission of a response impulse signal, so that the transmission timing calculator 13 can use the resulting corrected phase for the calculation of interaction. The above time successfully frees the calculation of interaction from errors.

In the alternative embodiments shown and described, the propagation distances of a data signal 43 and an impulse signal 31 may be substantially identical with each other, so that a data signal transmitter/receiver and an impulse signal transmitter/receiver may be implemented by a single circuit in the aspect of hardware. Although the propagation distances of a data signal 43 and an impulse signal 31 may be substantially the same, as stated above, the latter may be made far longer than the former, if desired.

In the illustrative embodiments, an impulse signal is transferred only once. The system may be adapted to transfer impulse signals two times or more. This can be done if two or more TTL fields are assigned to an impulse signal in order to distinguish a reference impulse signal as well as determine which time an impulse signal or response impulse signal has been transferred. In such a case, the phase correction value particular to the alternative embodiment described with reference to FIG. 7 should preferably be varied in accordance with the number of times of transfer effected.

With the illustrative embodiments, the nodes N are adapted for executing interaction, i.e. the variation of a phase signal according to the expressions (1) and (2). The present invention is practicable with any other suitable expressions. Further, the method of distinguishing a reference impulse signal from a response impulse signal shown and described is only illustrative, and may be replaced with, e.g. a method that varies the shapes or the frequencies of the signals themselves.

The present invention is specific to transferring an impulse signal which is necessary for determining or establishing a timing. The method of determining a transmission timing in a distributed coordination fashion on the basis of an impulse signal shown and described is only alternative, and may be modified in various ways, as taught in, e.g. Japanese patent laid-open publication No. 2005-94663.

The present invention is, of course, applicable not only to wireless communications networks but also to wired communications networks.

In summary, the present invention thus provides a telecommunications control apparatus for use in a telecommunications network system and flexible enough to allow each node to determine or establish its own transmission timing in a distributed coordination fashion without being controlled by a central management node.

The entire disclosure of Japanese patent application No. 2005-023974 filed on Jan. 31, 2005 including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A transmission timing control apparatus included in a network node constituting a telecommunications system for using a reception timing of a timing signal from another node to determine a transmission timing of a timing signal of the network node and determining a time slot for transmission of a data signal in accordance with the transmission timing and the reception timing of the timing signal from the other node, said apparatus comprising:

a transmission timing determining circuit for receiving a phase signal transmitted from the other node and representative of a data transmission timing of the other node to vary a state of a phase of the network node according to a rule to thereby determine a data transmission timing of the network node, the rule changing a rhythm of a nonlinear oscillation of the phase of the network node in response to an impulse signal received from the other node;

a decision circuit for determining whether the timing signal received from the other node is to be delivered to a response timing signal transmitter for transmitting a response timing signal; and a transmission timing control circuit for using a reception timing of the timing signal and a reception timing of the response timing signal to determine a transmission timing at which the network node transmits the timing signal.

2. The apparatus in accordance with claim 1, wherein a propagation range of the timing signal and a propagation range of the data signal are substantially equal to each other.

3. The apparatus in accordance with claim 1, wherein the response timing signal to be transmitted from said response timing signal transmitter is different in shape from the timing signal.

4. The apparatus in accordance with claim 1, further comprising a response timing corrector for turning back, then the timing signal received from the other node is a response timing signal, a reception phase of the response timing signal by a predetermined amount and inputting a resulting reception phase to said timing control circuit.

5. The apparatus in accordance with claim 4, wherein said transmission timing control circuit determines, as a transmission time slot of the network node, a period of time from transmission of the timing signal from the network node to an input timing of the response impulse signal corrected by said response timing correction and input for a first time.

6. A network node constituting a telecommunications system and comprising a communication timing control apparatus for using a reception timing of a timing signal from another node to determine a transmission timing of a timing signal of said network node and determining a time slot for transmission of a data signal in accordance with the transmission timing and the reception timing of the timing signal from the other node, wherein said apparatus comprises:

a transmission timing determining circuit for receiving a phase signal transmitted from the other node and representative of a data transmission timing of the other node to vary a state of a phase of the network node according to a rule to thereby determine a data transmission timing of the network node, the rule changing a rhythm of a nonlinear oscillation of the phase of the network node in response to an impulse signal received from the other node;

a decision circuit for determining whether the timing signal received from the other node is to be delivered to a response timing signal transmitter for transmitting a response timing signal;

a response timing signal transmitter for transmitting a response timing signal when having received the timing signal from the other node; and a transmission timing control circuit for using a reception timing of the timing signal and a reception timing of the response timing signal to determine a transmission timing at which said network node transmits the timing signal.

7. A telecommunications system constituted by a network node comprising a communication timing control apparatus for using a reception timing of a timing signal from another node to determine a transmission timing of a timing signal of the network node and determining a time slot for transmission of a data signal in accordance with the transmission timing and the reception timing of the timing signal from the other node, wherein said apparatus comprises:

a transmission timing determining circuit for receiving a phase signal transmitted from the other node and representative of a data transmission timing of the other node to vary a state of a phase of the network node according to a rule to thereby determine a data transmission timing of the network node, the rule changing a rhythm of a nonlinear oscillation of the phase of the network node in response to an impulse signal received from the other node;

a decision circuit for determining whether the timing signal received from the other node is delivered to a response timing signal transmitter for transmitting a response timing signal; and a transmission timing control circuit for using a reception timing of the timing signal and a reception timing of the response timing signal to determine a transmission timing at which said network node transmits the timing signal.

8. A method of controlling a communication timing of a network node constituting a telecommunications system, comprising the steps of:

using a phase signal transmitted from another node and representative of a data transmission timing of the other node to vary a state of a phase of the network node according to a rule to thereby determine a data transmission timing of the network node, the rule changing a rhythm of a nonlinear oscillation of the phase of the network node in response to an impulse signal received from the other node;

using a reception timing of a timing signal from the other node to determine a transmission timing of a timing signal of the network node;

determining a time slot for transmission of a data signal in accordance with the transmission timing and the reception timing of the timing signal from the other node;

determining whether the timing signal received from the other node is to be delivered to a response timing signal transmitter, and transmitting the response timing signal; and using a reception timing of the timing signal and a reception timing of the response timing signal to determine a transmission timing at which the network node transmits the timing signal.

9. The method in accordance with claim 8, wherein a propagation range of the timing signal and a propagation range of the data signal are substantially equal to each other.

10. The method in accordance with claim 8, wherein the response timing signal to be transmitted by said step of transmitting a response timing signal is different in shape from the timing signal.

11. The method in accordance with claim 8, further comprising the step of turning back, where the timing signal received from the other node is a response timing signal, a reception phase of the response timing signal by a predetermined amount and providing said step of determining the transmission timing with a resulting reception phase.

12. The method in accordance with claim 11, wherein said step of determining the transmission timing determines, as a transmission time slot of the network node, a period of time from transmission of the timing signal from the network node to an input timing of the response impulse signal corrected by said step of turning back and input for a first time.

* * * * *